(12) United States Patent
Smith et al.

(10) Patent No.: US 11,440,391 B2
(45) Date of Patent: Sep. 13, 2022

(54) BATTERY ASSEMBLY HAVING A CROSS-MEMBER AND METHOD OF MANAGING LOADS UTILIZING A CROSS-MEMBER

(71) Applicant: Ford Global Technologies, LLC, Dearborn, MI (US)

(72) Inventors: Micah Smith, Detroit, MI (US); Ihab Grace, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 16/774,253

(22) Filed: Jan. 28, 2020

(65) Prior Publication Data
US 2021/0229541 A1 Jul. 29, 2021

(51) Int. Cl.
*H01M 50/20* (2021.01)
*B60K 1/04* (2019.01)

(52) U.S. Cl.
CPC ............... *B60K 1/04* (2013.01); *H01M 50/20* (2021.01); *B60K 2001/0438* (2013.01); *H01M 2220/20* (2013.01)

(58) Field of Classification Search
CPC ........ H01M 50/20; B60K 1/04; B60K 1/0438
See application file for complete search history.

(56) References Cited

U.S. PATENT DOCUMENTS

| | | | |
|---|---|---|---|
| 6,676,200 B1 | 1/2004 | Peng | |
| 7,931,105 B2 | 4/2011 | Sato et al. | |
| 8,673,472 B2 * | 3/2014 | Cicero | H01M 10/6561 |
| | | | 429/96 |
| 8,702,161 B2 | 4/2014 | Charbonneau et al. | |
| 9,054,360 B2 | 6/2015 | Yi et al. | |
| 9,656,571 B2 | 5/2017 | Nusier et al. | |
| 9,660,234 B2 | 5/2017 | Nusier et al. | |
| 2019/0115574 A1 | 4/2019 | Marjanovic et al. | |

FOREIGN PATENT DOCUMENTS

| | | |
|---|---|---|
| CN | 106299176 | 1/2017 |
| CN | 208489263 | 2/2019 |
| CN | 109768191 | 5/2019 |
| CN | 107146865 | 9/2019 |
| DE | 102014203505 | 9/2014 |
| EP | 3428993 | 1/2019 |
| JP | 06270696 | 9/1994 |

* cited by examiner

*Primary Examiner* — Jane J Rhee
(74) *Attorney, Agent, or Firm* — David B. Kelley; Carlson, Gaskey & Olds, P.C.

(57) ABSTRACT

A battery assembly includes, among other things, a tray having a floor, a lid secured to the tray to provide an enclosure having an interior, and a battery module disposed within the interior. The battery module has a plurality of battery cell frames disposed along a battery module axis. The battery cell frames each include a frame toe that projects horizontally. The battery assembly further includes a cross-member disposed within the interior adjacent to the battery module. The cross-member includes a vertically extending wall having a protrusion that is vertically aligned with the frame toes of the plurality of battery cell frames.

20 Claims, 5 Drawing Sheets

_Fig-1_

_Fig-2_

BATTERY ASSEMBLY HAVING A CROSS-MEMBER AND METHOD OF MANAGING LOADS UTILIZING A CROSS-MEMBER

TECHNICAL FIELD

This disclosure relates generally to a cross-member utilized within a battery pack of an electrified vehicle and, more particularly, to a cross-member that can help to manage loads applied to the battery pack.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A battery assembly, according to an exemplary aspect of the present disclosure includes, among other things, a tray having a floor, a lid secured to the tray to provide an enclosure having an interior, and a battery module disposed within the interior. The battery module has a plurality of battery cell frames disposed along a battery module axis. The battery cell frames each include a frame toe that projects horizontally. The battery assembly further includes a cross-member disposed within the interior adjacent to the battery module. The cross-member includes a vertically extending wall having a protrusion that is vertically aligned with the frame toes of the battery cell frames.

In another example of the foregoing battery assembly, the tray further includes a forward wall, an aft wall, and opposing side walls extending horizontally from the forward wall to the aft wall. The cross-member extends along a cross-member axis between the opposing side walls of the tray.

In another example of the foregoing battery assembly, the frame toes are lower frame toes. The frame toes each provide an aperture that receives a tensioning member. The tensioning member is configured to compress the battery cell frames along the battery module axis.

In another example of the foregoing battery assembly, the battery module includes an interconnect board that is directly vertically above the lower frame toes of the battery cell frames.

In another example of the foregoing battery assembly, the battery cell frames each include an upper frame toe providing an aperture that receives another tensioning member configured to compress the battery cell frames along the battery module axis. The interconnect board is directly vertically beneath the upper frame toes.

In another example of the foregoing battery assembly, the interconnect board is vertically above all portions of the protrusion.

In another example of the foregoing battery assembly, when the battery assembly is loaded such that the battery module and the cross-member are moved relatively closer to each other horizontally, the protrusion is configured to contact the frame toes prior to other portions of the vertically extending wall.

In another example of the foregoing battery assembly, the cross-member includes a platform. The vertically extending wall extends vertically upward from the platform. The platform extends horizontally to a position vertically beneath the frame toes.

In another example of the foregoing battery assembly, the platform of the cross-member extends aft to the position vertically beneath the frame toes.

Another example of the foregoing battery assembly includes a thermal exchange device. A lip of the thermal exchange device is sandwiched vertically between the platform and the frame toes.

In another example of the foregoing battery assembly, the cross-member is secured to the floor of the tray with mechanical fasteners.

In another example of the foregoing battery assembly, the cross-member is an extruded cross-member.

In another example of the foregoing battery assembly, the cross-member has reflectional symmetry.

In another example of the foregoing battery assembly, the protrusion and the remaining portions of the cross-member are different parts of a single, continuous structure.

In another example of the foregoing battery assembly, the protrusion is at a vertically lower portion of the vertically extending wall. The vertically extending wall tapers from the protrusion to a primary portion of the vertically extending wall.

A method of managing loads within a battery pack according to another exemplary aspect of the present disclosure includes, among other things, providing a battery module within a battery pack. The battery module has a plurality of battery cell frames disposed along a battery module axis. The battery cell frames each include a frame toe that projects horizontally. The method further includes providing a cross-member within the battery pack. The cross-member has a vertically extending wall with a protrusion that is vertically aligned with the frame toes of the battery cell frames. When a load is applied to the battery pack that causes the battery cell frames to move horizontally relative to the cross-member such that the vertically extending wall contacts the battery cell frames, the method includes contacting the frame toes with the protrusion prior to the battery module contacting other portions of the vertically extending wall.

A further example of the foregoing method includes supporting the battery module on a platform of the cross-member. The vertically extending wall extends vertically upward from the platform.

A further example of any of the foregoing methods includes compressing the battery cell frames along the battery module axis using a tensioning member that is received within apertures provided by the frame toes.

In a further example of any of the foregoing methods, the cross-member extends longitudinally along a cross-member axis that, prior to the loading being applied, is perpendicular to the battery module axis.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary cross-members used within a battery pack of an electrified vehicle. In particular, the disclosure describes a cross-member that can help to control the kinematics of battery modules within the battery pack when a load is directed into the battery pack. The load can result from, for example, an impact load applied to a rear or a front of the electrified vehicle.

Figure 1:
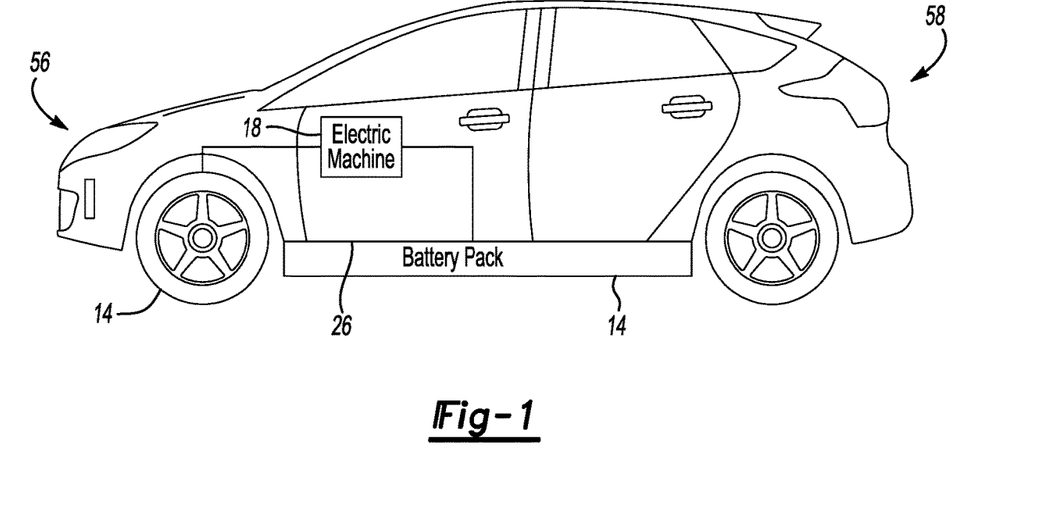
FIG. 1 illustrates a side view of an electrified vehicle.

Referring to FIG. 1, an electrified vehicle 10, in an exemplary non-limiting embodiment, includes a battery pack 14 that powers an electric machine 18. The electrified vehicle 10 includes wheels 22 driven by the electric machine 18. The electric machine 18 can receive electric power from the battery pack 14 and convert the electric power to torque to drive the wheels 22. The battery pack 14 can be a relatively high-voltage (e.g., 350 VDC) battery.

The battery pack 14 is secured to an underbody 26 of the electrified vehicle 10, but could be located elsewhere in other examples. The battery pack 14 can be secured to the underbody 26 using, for example, mechanical fasteners.

The electrified vehicle 10 is an all-electric vehicle. In other examples, the electrified vehicle 10 is a hybrid electric vehicle, which selectively drives wheels using torque provided by an internal combustion engine instead of, or in addition to, the electric machine 18. Generally, the electrified vehicle 10 could be any type of vehicle having a traction battery pack.

Figure 2:
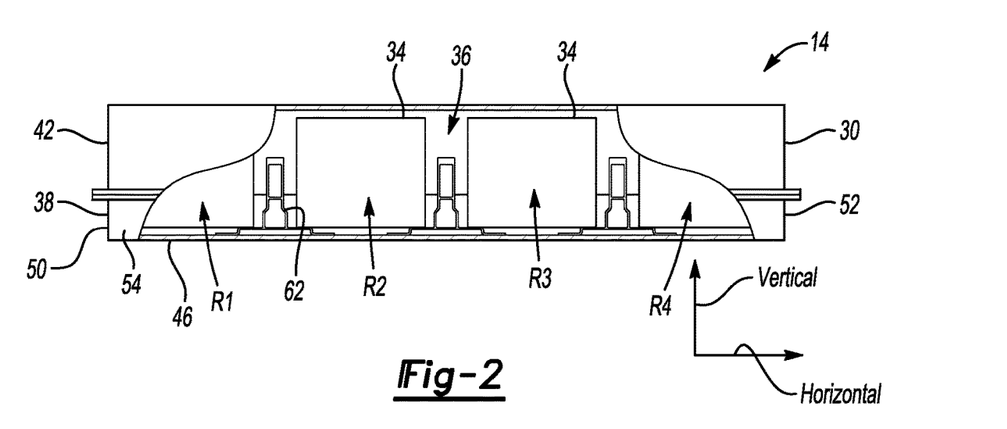
FIG. 2 illustrates a schematic view of a battery pack from the electrified vehicle of FIG. 1 with selected portions of an enclosure removed to reveal battery modules and cross-members within an interior of the enclosure.

Referring now to FIG. 2 with continuing reference to FIG. 1, the battery pack 14 includes an enclosure 30 housing a plurality of battery modules 34. The enclosure 30, in this exemplary non-limiting embodiment, includes a tray 38 and a lid 42. The lid 42 is secured to the tray 38. The battery modules 34 are disposed within an interior 36 of the enclosure 30.

The tray 38 includes a floor 46, a forward wall 50, an aft wall 52, and opposing sidewalls 54 that extend horizontally from the forward wall 50 to the aft wall 52. The forward wall 50, the aft wall 52, and the opposing sidewalls 54 extend vertically upward from the floor 46. The opposing sidewalls 54 extend horizontally from the forward wall 50 to the aft wall 52. Vertical and horizontal, for purposes of this disclosure, are with reference to ground in the ordinary orientation of the electrified vehicle 10 during operation.

Forward and aft are also with reference to the orientation of the electrified vehicle 10. That is, the forward wall 50 is closer to a front 56 of the electrified vehicle 10 than the aft wall 52. Also, the aft wall 52 is closer to a rear 58 of the electrified vehicle 10 than the forward wall 50.

A plurality of cross-members 62 are disposed within the interior of the enclosure 30. The cross-members 62 each extend longitudinally along a respective cross-member axis. The cross-member axes extend in a cross-vehicle direction and are perpendicular to the plane of the page in FIG. 2. The cross-members 62, in the exemplary embodiment, extend from one of the sidewalls 54 to the opposing sidewall 54. That is, in the exemplary embodiment, the cross-members 62 directly contact both of the sidewalls 54. The cross-members 62 are each spaced a distance from each other and from both the forward wall 50 and the aft wall 52 of the tray 38.

The cross-members 62 help to enhance the overall structural integrity of the battery pack 14. In the exemplary embodiment, the cross-members 62 are also utilized to support the battery modules 34 at a position where the battery modules 34 are elevated with respect to the floor 46 of the tray 38.

The battery modules 34 of the exemplary embodiment are arranged in four rows R1, R2, R3, and R4. Row R1 is forward of rows R2 to R4, row R2 is forward of rows R3 and R4, and row R3 is forward of row R4. Along a longitudinal axis of the electrified vehicle 10, one of the cross-members 62 is used to support the battery modules 34 in rows R1 and R2, another of the cross-members 62 is used to support the battery modules 34 in rows R2 and R3, and the remaining cross-member 62 is used to support the battery modules 34 in rows R3 and R4.

Other exemplary battery packs could include other arrangements of battery modules and cross-members. Another battery pack could, for example, include more than four rows of battery modules. Yet another battery pack could include more than one vertical tier of battery modules.

Figure 3:
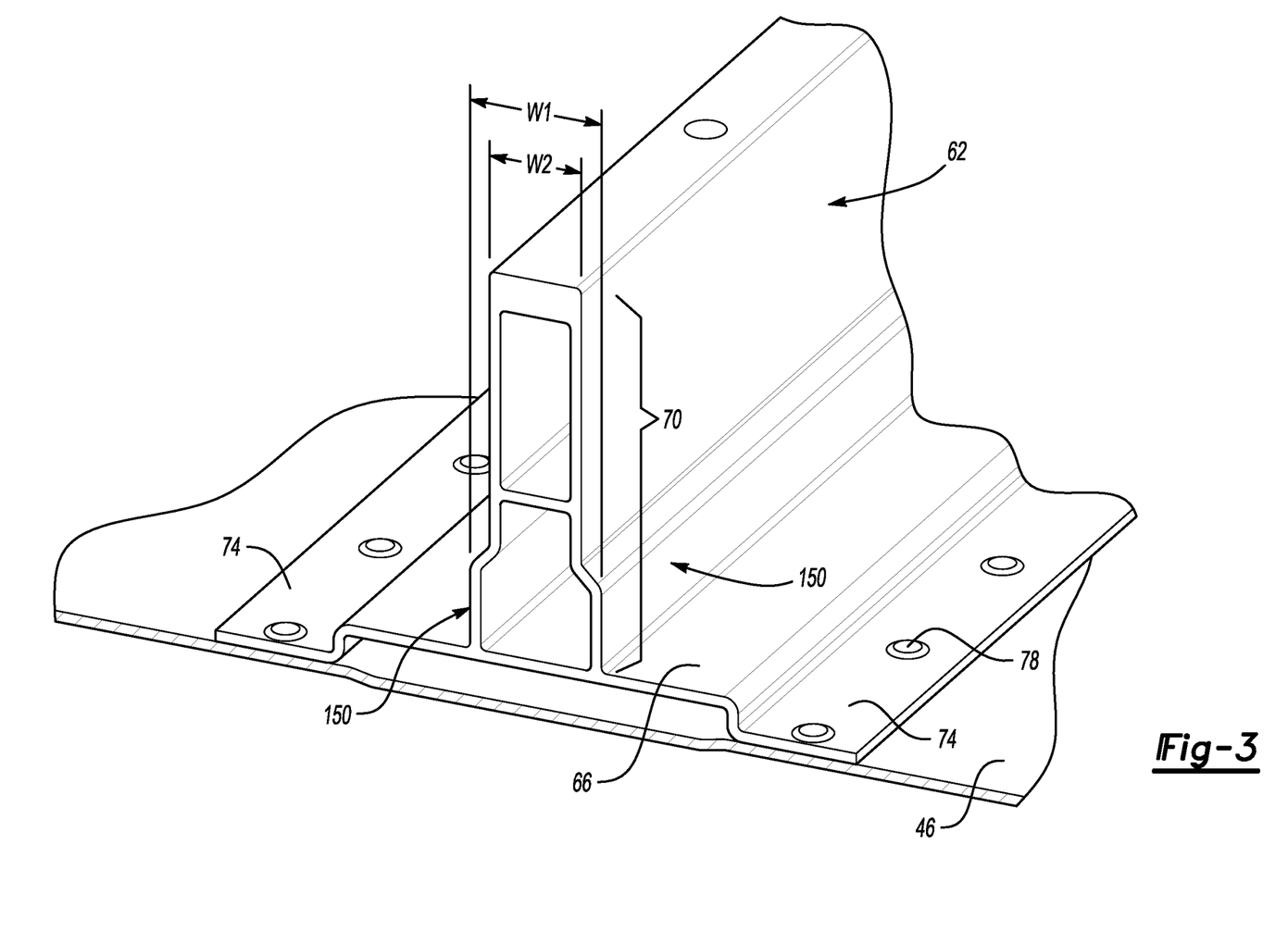
FIG. 3 illustrates a perspective, end view of a cross-member from the battery pack of FIG. 2 secured to a floor of the enclosure.

With reference now to FIG. 3 and continuing reference to FIGS. 1 and 2, the cross-members 62 each include a platform 66 and a vertically extending wall 70 that extends vertically from the platform 68. The exemplary cross-members 62 further include flanges 74 that extend horizontally from the opposing lateral sides of the platform 66. In the exemplary embodiment, the vertically extending wall 70, the platform 66, and the flanges 74 are areas of a single, continuous structure.

Within the battery pack 14, the cross-members 62 can be secured directly to the floor 46 of the tray 38 using, for example, welds or mechanical fasteners. The exemplary embodiment utilizes rivets 78 to attach the flanges 74 directly to the floor 46 of the tray 38, which secures the cross-members 62 to the floor 46. Within the battery pack, the platform 66 is utilized to support the battery modules 34.

The cross-member 62 can be an extruded cross-member and can be a metal or metal alloy. In a specific example, the cross-member 62 is an aluminum material. Notably, a person having skill in this art would be able to structurally distinguish a component that is extruded from a component that is not extruded. Thus, designating the cross-member 62 as, in an example, an extruded cross-member implicates structure.

The cross-member 62 has reflectional symmetry about a vertical plane. That is, the forward half of the cross-member 62 is a mirror image of the rear half of the cross-member 62.

Figure 4:
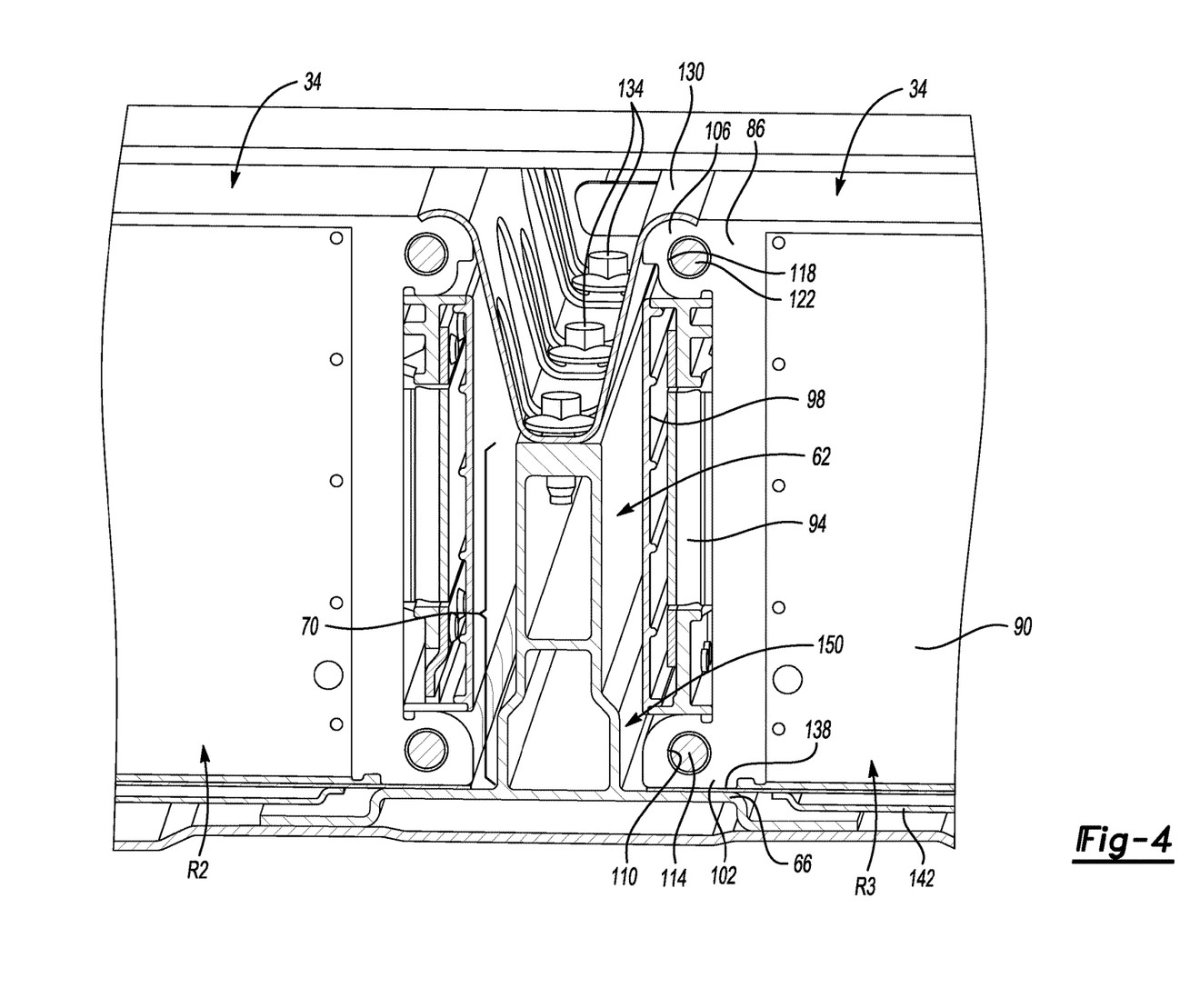
FIG. 4 illustrates a perspective, section view through battery modules and a cross-member from the battery pack of FIG. 2.
Figure 5:
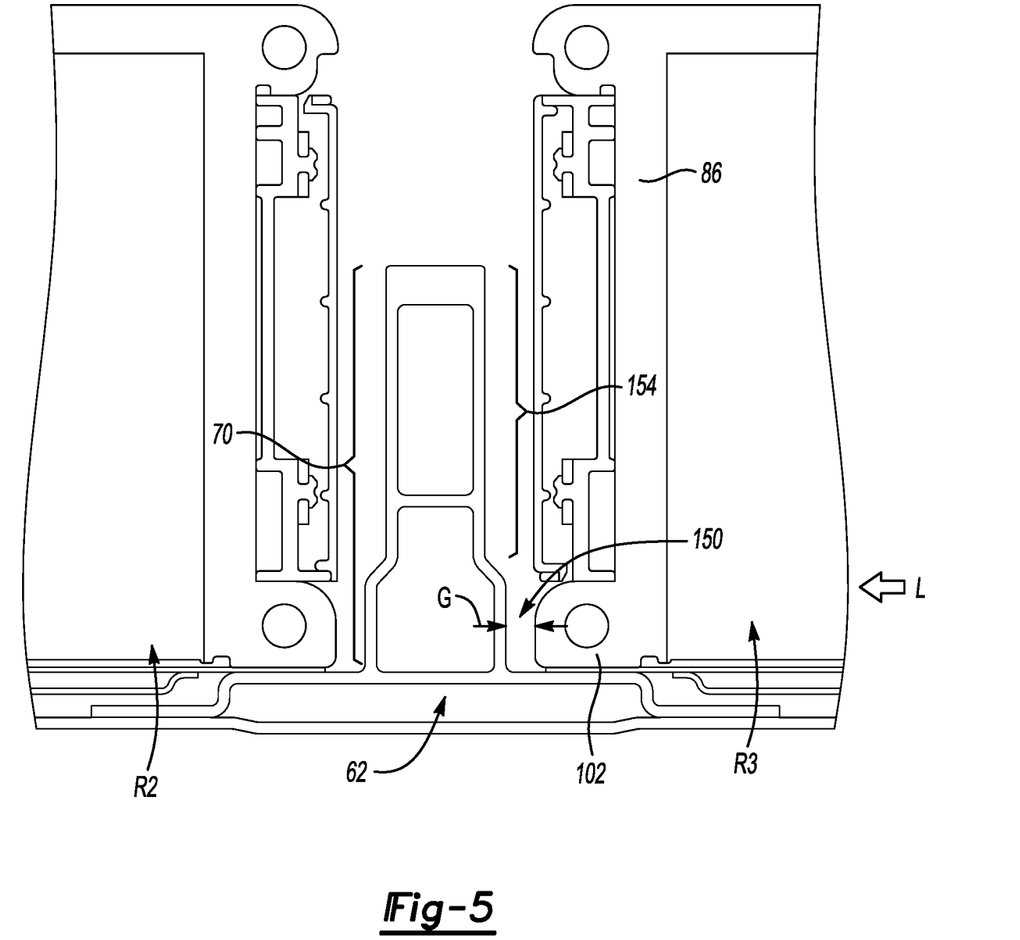
FIG. 5 illustrates an end view of the section of FIG. 4.
Figure 6:
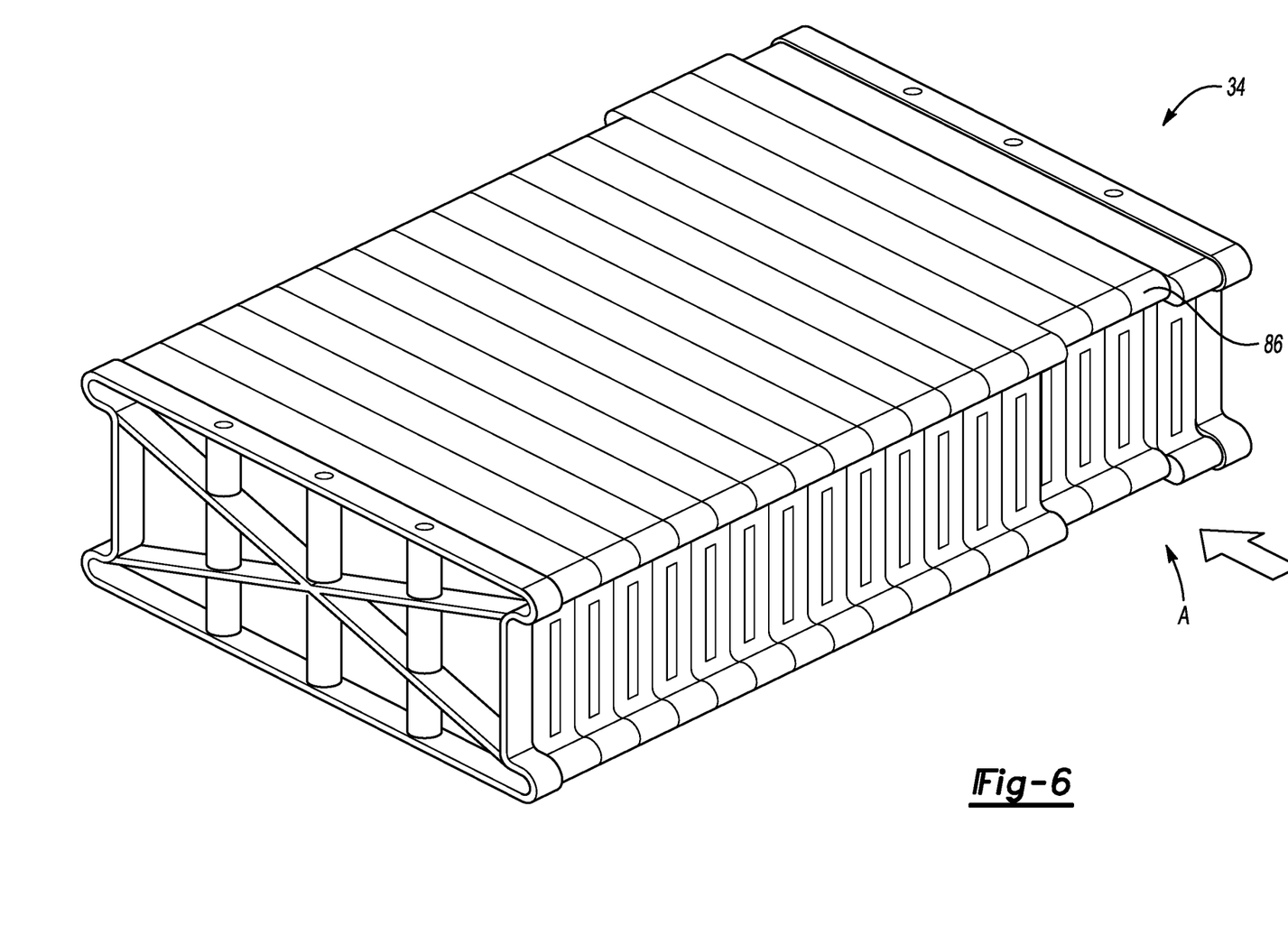
FIG. 6 illustrates a perspective view of a battery module from the battery pack of FIG. 2 after being loaded.

FIGS. 4 and 5 illustrate the battery modules 34 in row R2 and row R3 and the cross-member 62 disposed between the battery modules 34 in row R2 and row R3. The battery modules 34 in rows R1 and R4 and the remaining cross-members 62 of the battery pack 14 are configured similarly to the battery modules 34 and cross-member 62 shown in FIG. 4.

The battery modules 34 each include, among other things, a plurality of battery cell frames 86, a plurality of battery cells 90, an interconnect board 94, and a cover 98.

The battery cell frames 86 and battery cells 90 of the battery modules 34 are each disposed along a respective battery module axis, which extends perpendicular to the plane of the page in FIG. 5. The cross-member axes are, in an installed position as shown, parallel to the battery module axes.

One or more battery cells 90 is held within each of the battery cell frames 86. The battery cell frames 86 can be a polymer or polymer-based material.

The battery cell frames 86 each include a lower frame toe 102 and an upper frame toe 106. The lower frame toes 102 and the upper frame toes 106 each project horizontally from the remaining portions of the battery cell frames 86. The lower frame toes 102 and the upper frame toes 106 each project horizontally away from the battery module axis.

The lower frames toes 102 include apertures 110 that receive a lower tensioning member 114. The lower tensioning member 114 can be used to secure together the battery cell frames 86 by compressing the battery cell frames 86 along the battery module axis. The upper frame toes 106 include apertures 118 that receive an upper tensioning member 122, which is also used to compress the battery cell frames 86 along the battery module axis.

The interconnect board 94 is disposed at a laterally outboard side of the battery modules 34. The interconnect board 94 can be utilized to electrically couple together terminals of the battery cells 90. The interconnect board 94 can be used to provide electrical sensor connections to the battery cells 90 and other areas of the battery module 34.

The interconnect board 94 is directly vertically above the lower frame toes 102 of the battery cell frames 86. The upper frame toes 106 are directly vertically above the interconnect board 94.

The cover 98 covers the interconnect board 94 such that the interconnect board 94 is enclosed between the cover 98 and the battery cell frames 86. The cover 98 can be a polymer-based material, such as polypropylene.

The platform 66 of the cross-member 62 extends horizontally to a position vertically beneath the lower frame toes 102 of the battery cell frames 86. The platform 66 extends aft to a position beneath the lower frame toes 102 of the battery cell frames 86 in the row R3. The platform 66 extends forward to a position beneath the lower frame toes 102 of the battery cell frames 86 in the row R2.

A clamping member 130 hooks over the upper frame toes 106. The clamping member 130 is secured to the cross-member 62 by a plurality of mechanical fasteners 134. The cross-member 62 thus provides an anchoring location for the clamping member 130. When secured, the clamping member 130 exerts a downward force on the battery cell frames 86 to help secure the battery modules 34.

Vertically between the lower frame toes 102 and the platform 66 is a lip 138 of a thermal exchange device 142. The lip 138 of the thermal exchange device 142 is sandwiched between the lower frame toes 102 and the platform 68 of the cross-member 62 when the clamping member 130 is compressing the battery cell frames 86 downward.

The battery cell frames 86 and battery cells 90 are vertically above the thermal exchange device 142. A coolant can be circulated through the thermal exchange device 142 to manage thermal energy levels within the battery modules 34.

The battery modules 34 of the exemplary battery pack 14 are considered flexible battery modules. In a flexible battery module, components can move somewhat relative to each other in response to a load above a threshold level being applied to the battery module 34. In a typical flexible battery module the endplates at opposing axial ends of the battery module are secured directly to a tray, whereas the frames are not directly secured to a tray. This facilitates some shifting of the frames when the battery module is loaded.

FIG. 5 shows an exemplary battery module 34 having been subjected to a load L. In the example, the load is an impact load applied to the rear 58 of the electrified vehicle 10 (FIG. 1). The load, as shown, has the area A of the battery module 34 to shift relative to other areas of the battery module 34. The lower tensioning members 114 and the upper tensioning members 122 can flex as the area A shifts relative to the other areas of the battery module 34.

As can be appreciated, shifting of areas of the battery module 34 can cause the battery modules 34 to move relative to the cross-members 62 and, in some examples, contact the cross-members 62. Some areas of the battery modules 34, such as areas containing the interconnect board 94, are relatively sensitive and less suited to contacting the cross-members 62 than other areas having more rigid and robust components. This can be due to, among other things, sensors and electrical connections of the interconnect board 94. The example cross-member 62 includes features to inhibit movement of certain areas of the battery modules 34 into the cross-member 62 while permitting other areas, with relatively rigid components, to contact the cross-member.

In particular, with reference again to FIGS. 3-5, the vertically extending wall 70 of the cross-member 62 includes protrusions 150. One protrusion 150 protrudes horizontally aft toward the battery modules 34 of row R3. The other protrusion 150 protrudes forward toward the battery modules 34 of row R2.

The protrusions 150 are at a vertically lower portion of the vertically extending wall 70. The protrusions 150 are vertically aligned with the lower frame toes 102 of the battery cell frames 86. That is, the protrusions 150 and the lower frame toes 102 have substantially the same vertical height and are disposed at the same vertical position within the battery modules 34. The vertically extending wall 70 tapers from the protrusions 150 to a primary portion 154 of the vertically extending wall 70, which is vertically above the protrusions 150.

A horizontal width W1 of the vertically extending wall 70 in the area of the protrusion 150 is greater than a horizontal width W2 of the primary portion 154 of the vertically extending wall 70.

When a load is applied to the battery pack 14 that causes areas of the battery module 34 in the row R2 to shift rearward relative to the cross-member 62, the lower frame toes 102 of the battery modules 34 in the row R2 will first contact the protrusion 150 on the forward side of the cross-member 62. When a load is applied to the battery pack 14 that causes areas of the battery module 34 in the row R3 to shift forward relative to the cross-member 62, the lower frame toes 102 of the battery modules 34 in the row R3 will first contact the protrusion 150 on the aft side of the cross-member 62. The loads applied to the battery pack 14 are thus managed by contacting the lower frame toes 102 with the protrusion 150 prior to the battery module 34 contacting other portions of the vertically extending wall 70 of the cross-member 62.

Contacting the lower frame toes 102 against the protrusion 150 helps to keeps the interconnect board 94 spaced from the primary portion 154 of the vertically extending wall 70. After contact between the lower frame toes 102 and the respective protrusion 150, the battery modules 34 may continue to rotate about the point of contact such areas of the battery module 34 contact the primary portion 154 of the cross-member 62. However, the load required to cause such contact is substantially higher than if the lower frame toes 102 did not first contact the protrusions 150.

In the past, battery packs have included cross-members. The present disclosure details a specific type of cross-member incorporating horizontally protruding protrusions that can align with selected portions of battery cell frames to contact those portions of the battery cell frames thereby inhibiting certain areas of the battery modules from contacting the cross-member.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   a tray having a floor;
   a lid secured to the tray to provide an enclosure having an interior;
   a battery module disposed within the interior, the battery module having a plurality of battery cell frames disposed along a battery module axis, the plurality of battery cell frames each including a frame toe that projects horizontally; and
   a cross-member disposed within the interior adjacent to the battery module, the cross-member including a vertically extending wall having a protrusion that is vertically aligned with the frame toes of the plurality of battery cell frames, the vertically extending wall of the cross-member extending longitudinally from a first end portion of the cross-member to an opposite, second end portion of the cross-member.

2. The battery assembly of claim 1, wherein the tray further includes a forward wall, an aft wall, and opposing side walls extending horizontally from the forward wall to the aft wall, wherein the cross-member and the vertically extending wall extend along a cross-member axis between the opposing side walls of the tray.

3. The battery assembly of claim 1, wherein the frame toes are lower frame toes, wherein the frame toes each provides an aperture that receives a tensioning member, the tensioning member configured to compress the plurality of battery cell frames along the battery module axis.

4. The battery assembly of claim 3, wherein the battery module includes an interconnect board that is directly vertically above the lower frame toes of the plurality of battery cell frames.

5. The battery assembly of claim 4, wherein the plurality of battery cell frames each include an upper frame toe providing an aperture that receives another tensioning member configured to compress the plurality of battery cell frames along the battery module axis, the interconnect board directly vertically beneath the upper frame toes.

6. The battery assembly of claim 1, wherein interconnect board is vertically above all portions of the protrusion.

7. The battery assembly of claim 1, wherein, when the battery assembly is loaded such that the battery module and the cross-member are moved relatively closer to each other horizontally, the protrusion is configured to contact the frame toes prior to other portions of the vertically extending wall.

8. The battery assembly of claim 1, wherein the cross-member includes a platform, the vertically extending wall extending vertically upward from the platform, the platform extending horizontally to a position vertically beneath the frame toes, the platform of the cross-member extending longitudinally from a first end portion of the cross-member to an opposite, second end portion of the cross-member.

9. A battery assembly, comprising:
   a tray having a floor;
   a lid secured to the tray to provide an enclosure having an interior;
   a battery module disposed within the interior, the battery module having a plurality of battery cell frames disposed along a battery module axis, the plurality of battery cell frames each including a frame toe that projects horizontally; and
   a cross-member disposed within the interior adjacent to the battery module, the cross-member including a vertically extending wall having a protrusion that is vertically aligned with the frame toes of the plurality of battery cell frames,
   wherein the cross-member includes a platform, the vertically extending wall extending vertically upward from the platform, the platform extending horizontally to a position vertically beneath the frame toes,
   wherein the platform of the cross-member extends aft to the position vertically beneath the frame toes.

10. The battery assembly of claim 8, further comprising a thermal exchange device, wherein a lip of the thermal exchange device is sandwiched vertically between the platform and the frame toes.

11. The battery assembly of claim 1, wherein the cross-member is secured to the floor of the tray with mechanical fasteners.

12. The battery assembly of claim 1, wherein the cross-member is an extruded cross-member.

13. The battery assembly of claim 1, wherein the cross-member has reflectional symmetry.

14. The battery assembly of claim 1, wherein the protrusion and the remaining portions of the cross-member are different parts of a single, continuous structure.

15. The battery assembly of claim 1, wherein the protrusion is at a vertically lower portion of the vertically extending wall, wherein the vertically extending wall tapers from the protrusion to a primary portion of the vertically extending wall.

16. A method of managing loads within a battery pack, comprising:
   providing a battery module within a battery pack, the battery module having a plurality of battery cell frames disposed along a battery module axis, the plurality of battery cell frames each including a frame toe that projects horizontally;
   providing a cross-member within the battery pack, the cross-member having a vertically extending wall with a protrusion that is vertically aligned with, and spaced a distance from, the frame toes of the plurality of battery cell frames; and when a load is applied to the battery pack that causes the plurality of battery cell frames to move horizontally relative to the cross-member such that the vertically extending wall contacts the battery cell frames, contacting the frame toes with the protrusion prior to the battery module contacting other portions of the vertically extending wall.

17. The method of claim 16, further comprising supporting the battery module on a platform of the cross-member, the vertically extending wall extending vertically upward from the platform.

18. The method of claim 16, further comprising compressing the battery cell frames along the battery module axis using a tensioning member that is received within apertures provided by the frame toes, wherein the tensioning member extends longitudinally in a direction that is perpendicular to the battery module axis.

19. The method of claim 16, wherein the cross-member extends longitudinally along a cross-member axis that, prior to the loading being applied, is perpendicular to the battery module axis.

20. The battery assembly of claim 1, wherein the cross-member has a consistent cross-section along a length of the cross-member.

* * * * *